United States Patent

Maurer et al.

(10) Patent No.: US 6,680,134 B2
(45) Date of Patent: Jan. 20, 2004

(54) TRANSPARENT SUBSTRATE PROVIDED WITH A HEAT-REFLECTIVE MULTILAYER STACK

(75) Inventors: Marc Maurer, Compiegne (FR); Norbert Huhn, Herzogenrath (DE); Pascal Le Masson, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/084,060

(22) Filed: Feb. 28, 2002

(65) Prior Publication Data
US 2002/0197459 A1 Dec. 26, 2002

Related U.S. Application Data

(63) Continuation of application No. PCT/FR00/02582, filed on Sep. 15, 2000.

(30) Foreign Application Priority Data

Sep. 16, 1999 (FR) .............................. 99 11571

(51) Int. Cl.[7] .............................. B32B 9/00; B32B 1/10
(52) U.S. Cl. .................... 428/698; 428/412; 428/425.8; 428/425.9; 428/432; 428/434; 428/469; 428/697; 428/699; 428/701; 428/702; 428/704; 359/580; 359/359
(58) Field of Search .............................. 428/412, 425.8, 428/425.9, 432, 434, 469, 697, 698, 699, 701, 702, 704, 688, 689; 359/359, 360, 580, 585

(56) References Cited

U.S. PATENT DOCUMENTS

| | | | | |
|---|---|---|---|---|
| 4,462,883 A | | 7/1984 | Hart | 204/192 |
| 4,985,312 A | | 1/1991 | Furuya et al. | 428/627 |
| 5,595,825 A | * | 1/1997 | Guiselin | 428/428 |
| 5,935,702 A | | 8/1999 | Macquart et al. | 428/336 |
| 5,948,538 A | * | 9/1999 | Brochot et al. | 428/432 |

FOREIGN PATENT DOCUMENTS

| | | |
|---|---|---|
| DE | 19808795 | 9/1999 |
| EP | 0877005 | 2/2000 |
| GB | 2279365 | 1/1995 |

* cited by examiner

*Primary Examiner*—Deborah Jones
*Assistant Examiner*—Ling Xu
(74) *Attorney, Agent, or Firm*—Pennie & Edmonds LLP

(57) ABSTRACT

The subject of the invention is a flexible or rigid, transparent substrate provided with a stack of thin layers, which includes at least one functional layer predominantly based on silver Ag placed between two coatings of dielectric material, at least one of the coatings comprising a layer predominantly based on aluminum nitride AlN. The functional layer or at least one of the functional layers is modified by incorporating at least one minor metal M other than Ag and/or the said AlN-based layer, or at least one of them, is modified by incorporating at least one metal M' in a minor amount compared with the aluminum.

24 Claims, No Drawings

TRANSPARENT SUBSTRATE PROVIDED WITH A HEAT-REFLECTIVE MULTILAYER STACK

This is a continuation of PCT/FR00/02582, filed on Sep. 15, 2000 which claims priority to France Application No. FR99/11571, filed on Sep. 10, 1999.

FIELD OF THE INVENTION

The invention relates to a stack of interferential thin layers at least partially reflecting in the infrared, especially that emitted by solar radiation, and which comprises at least one "functional" layer and coatings of dielectric material which are placed on each side of the latter.

SUMMARY OF THE INVENTION

The expression "functional layer(s)" is understood within the invention to mean the layer or layers which, within the stack, have the desired thermal reflection properties and which are metallic, more particularly based on a noble metal of the Ag type.

The expression "coatings of dielectric material" is understood within the invention to mean a layer or a superposition of layers of dielectric material of the metal oxide, metal nitride or silicon nitride type, especially having the function of adjusting the optical appearance of the stack, especially of lowering the light reflection, and optionally the function of protecting the "functional" layer or layers.

Thus, the present invention relates to stacks of the type:

(dielectric coating/functional layer/dielectric coating)

this sequence being possibly repeated n times, with n=2 or 3.

DETAILED DESCRIPTION OF THE PREFERRED EMBODIMENTS

The invention concerns multilayer stacks on a rigid substrate of the glass or rigid polymer, such as polycarbonates PC or polymethyl methacrylate PMMA, type. It is possible to use substrates in glazing units, by themselves or mounted as insulating or laminated glazings. However, the invention relates more particularly to flexible substrates based on polymer, especially polyurethane PU or polyethylene terephthalate.

Studies have already been carried out on stacks comprising silver layers interspersed with AlN and/or metal-oxide dielectrics, these multilayer stacks being deposited on PET substrates. Reference may especially be wade to Patent Application PCT/FR99/00466 filed on Mar. 2, 1999 in the name of Saint-Gobain Vitrage.

It is advantageous for all or some of the dielectric coatings used to be based on a nitride, especially the two most common in this application, namely aluminium nitride AlN or silicon nitride $Si_3N_4$. This is because nitride-based dielectrics are particularly stable chemically and can thus effectively fulfil the role of "barrier layer" with respect to the silver layer or layers. It is therefore advantageous to place them at least as a "sublayer" directly on the substrate and/or as an "overlayer" as the final layer of the stack.

However, their use is not without drawbacks: this is because it has been found that their adhesion to silver is not optimal, which results, moreover, in the stack being quite fragile, with the risk of delamination and problems of optical quality. One possibility of increasing this mutual adhesion consists in interposing, between the silver layer and the nitride layer, a thin layer which will act as an adhesion layer, this thin layer being, for example, made of a metal of the Ti type, which does not necessarily have to be continuous. This possibility gives good results, but increases the number of layers in the stack.

The object of the invention is therefore to remedy the abovementioned drawbacks, especially to improve the quality of the stacks of thin layers comprising both silver-based layers and nitride-based layers, without causing difficulties or complications in their manufacture on an industrial scale.

The subject of the invention is firstly a flexible or rigid, transparent substrate provided with a stack of thin layers, which includes at least one functional layer predominantly based on silver Ag placed between two coatings of dielectric material, at least one of the coatings comprising a layer predominantly based on aluminium nitride AlN. According to the invention, the functional layer (or at least one of the functional layers) is chemically modified by incorporating at least one minor metal M other than Ag.

Alternatively or in addition, the AlN-based layer (or at least one of the AlN-based layers) is also chemically modified by incorporating at least one minor metal M' other than aluminium Al.

The metal M and the metal M' may be incorporated by using (as moreover for all the other layers in the stack) the known vacuum deposition technique of sputtering, preferably magnetic-field-enhanced sputtering: what is then provided is, respectively, a silver target alloyed with the metal M in question (deposition in an inert atmosphere, possibly containing nitrogen) and an aluminium target alloyed with the metal M' in question (deposition of the nitride in a nitriding reactive atmosphere, containing nitrogen).

The term "metal" within the meaning of the invention includes silicon. To make the targets, the alloy may be made in a known manner by sintering a mixture of powders of the metals in question. The Al target may also be partially covered with the metal in question.

It has thus proved possible to increase the affinity between the silver and the metal nitrides, such as AlN, by slightly modifying one or both, this modification being sufficient for them to adhere significantly better to each other, but being sufficiently moderate not to cause any deterioration in the desired properties of these materials (optical and thermal properties). It is thus conceivable to dispense with additional layers being interposed between them to facilitate their mutual adhesion, this being a great advantage from the industrial standpoint since the fewer the number of layers, the greater the production efficiency and the more compact the production line may be.

The invention applies most particularly to stacks containing n functional layers and (n+1) dielectric coatings with: $n \geq 1$, especially n=1, n=2 or n>2. As recalled in the preamble of this text, the substrates may be rigid or flexible.

The metal M that can be incorporated into the silver-based layer is aluminium, copper or gold. Preferably, between 0.1 and 10%, especially between 0.5 and 2%, by weight of the metal M is added to the silver layer.

The metal M' that can be incorporated into the AlN-based layer is chosen from at least one of the following metals: Zn, Ti, Sn, Mn, Mg, Ag. It is preferred to add approximately 0.1 to 10%, especially 0.5 to 2%, by weight of the metal M' with respect to the aluminium of the layer.

The first preferred embodiment according to the invention consists in the stack comprising at least one silver-based functional layer modified according to the invention, which layer is contiguous with a standard layer at least based on AlN (or one which is also modified according to the invention): in this case, it is more a question of adapting the Ac layer to the AlN layer.

The second preferred embodiment according to the invention, as an alternative or in addition to the first embodiment, consists in the stack comprising at least one AlN-based layer modified according to the invention, which layer is contiguous with a standard silver-based functional layer (or one which is also modified according to the invention). The reverse approach is adopted here, in which it is more a question of seeking to make the AlN more "compatible" with the silver.

One possible variant of the invention consists in placing the functional layer (or at least one of them or each of them if the stack comprises more than one of them) so as to be in contact on one of its faces with an AlN layer (one of the two layers or both of them being modified according to the invention), the other face of the functional layer being in contact with a layer of a metal oxide or of a mixture of metal oxides, such as ZnO, $TiO_2$, $SnO_2$, $Nb_2O_5$, $Ta_2O_5$. As the aforementioned PCT patent application stresses, it is in fact advantageous, optionally, to provided, beneath the silver-based layers, layers made of an oxide of the ZnO type which provide very intimate contact with the silver.

This oxide layer may be the last of a superposition of oxide and/or nitride layers, such as AlN or $Si_3N_4$ layers.

Another variant (which can be added to the previous one) consists in placing the AlN layer modified according to the invention so as to be in direct contact with the silver layer and to have a greater concentration of metal M' near its interface with this silver layer. In other words, it is possible to have a concentration gradient of metal M' in the AlN layer, with a concentration increasing towards the AlN/Ag interface. The industrially simplest embodiment consists in fact in dividing the AlN layer into several "strata", the closest stratum to the silver layer being the richest in metal M' (obtained from an Al-M' target) and the rest of the layer being depleted in metal M' or even completely devoid of metal M' (Al target). Thus, it is possible to have the following bilayer structure:

AlN:M'/AlN or AlN/M':AlN.

This is because it can be slightly prejudicial in terms of light absorption to have AlN containing a metal whose nitride is relatively absorbent (as is the case with titanium for example) over a significant thickness. Thus, by "duplicating" the layer it is possible to increase the adhesion to silver without any risk of optically degrading the stack.

There are three non-limiting embodiments of the invention with two silver layers:

the sequence: substrate/metal oxide/Ag$^{(1)}$/metal oxide/Ag$^{(2)}$/AlN the sequence: substrate/AlN/Ag$^{(1)}$/metal oxide/Ag$^{(2)}$/AlN the sequence: substrate/Ag$^{(1)}$/AlN/Ag$^{(2)}$/AlN.

In all three cases, when there is direct contact between AlN and Ag, one or both of them is modified according to the invention. The term "metal oxide" is understood to mean a layer of a metal oxide or several different oxides, or a nitride layer AlN or $Si_3N_4$ "flanked" by oxide layers (or thin layers of metal of the Ti or NiCr type).

In the simplest variant with a metal oxide layer, $TiO_2$ is especially preferred.

It remains within the scope of the invention for one of the Ag functional layers not to follow the teaching of the invention, unlike the other, and to be, for example, in contact with an AlN or $Si_3N_4$ layer via a thin layer intended to increase their mutual adhesion, for example a titanium layer.

It is also possible within the scope of the invention to substitute an AlN layer or at least one of them with an $Si_3N_4$ layer, which may be chemically modified like the AlN.

The subject of the invention is also any glazing which incorporates the multilayer-coated substrate described above. In particular, this is laminated glazing using a PET-type flexible substrate coated with the layers according to the invention and laminated by means of two thermoplastic adhesive sheets of the polyvinyl butyral (PVB) or ethylene/vinyl acetate (EVA) type with two glass-type rigid substrates.

The glazing of the invention, whether monolithic, laminated or mounted as insulating double glazing, may be used in buildings or for equipping vehicles, especially as laminated side windows or windscreens.

The invention will be described below with the aid of specific non-limiting examples.

All the layers are deposited in a known way, by sputtering, on a PET sheet having a thickness of approximately 50 micrometers (this sheet being biaxially oriented in a known manner).

EXAMPLE 1

(the thicknesses of the layers indicated are in nm for all the examples)

PET/$TiO_2$/Ag/$TiO_2$/Ag/Ti:AlN 30 nm 10 nm the Ti:AlN containing 1.5% Ti by weight with respect to Al, as is also the case in Examples 2 and 3. It is possible to vary this content, preferably within a range from 0.5 to 2.5%.

EXAMPLE 2

PET/AlN/Ag/$TiO_2$/Ag/Ti:AlN 30 nm 10 nm 56 nm 10 nm 40 nm

EXAMPLE 3

PET/$TiO_2$/Ag/Ti/$TiO_2$/ZnO/Ag/Ti:AlN 30 nm 10 nm 1 nm 56 nm 10 nm 40 nm

In Examples 1 and 2, metal layers, especially Ti layers of very small thickness, may optionally be interposed between the $TiO_2$ layers and the Ag layers. This is more particularly preferred on top of the first silver layer, as a "blocker" layer to prevent any degradation of the silver during the deposition of the $TiO_2$ layer in an oxidizing reactive atmosphere. Thus, between 1 and 2 nm of Ti may be provided on top of the first Ag layer.

It is also possible to provide a very thin, but not necessarily continuous, metal layer directly under the second silver layer, for example a layer also made of titanium and with a thickness, for example, of between 0.2 and 1 nm.

What is claimed is:

1. A transparent substrate comprising a base and a stack of thin layers, wherein said stack of thin layers comprises:

(i) a first coating of dielectric material;

(ii) a second coating of dielectric material; and (iii) a functional layer wherein the functional layer comprises silver, has a first face and a second face, is disposed between the first coating of dielectric material and the second coating of dielectric material, and at least one of the first coating of dielectric material or the second coating of dielectric material contacts the functional layer at an interface;

wherein at least one of the first coating of dielectric material or the second coating of dielectric material that contacts the functional layer at an interface comprises AlN; and wherein the functional layer comprises a first metal other than silver and/or at least one of the first coating of dielectric material or the second coating of dielectric material comprising AlN that contacts the functional layer at an interface comprises a second metal other than Al.

2. The substrate of claim 1, wherein the stack of thin layers comprises n functional layers and n+1 coatings of dielectric material and n is 2 or more.

3. The substrate of claim 1, wherein the base comprises glass or a polymer comprising polycarbonate or polymethyl methacrylate.

4. The substrate of claim 1, wherein the base comprises a polymer of polyurethane or polyethylene terephthalate.

5. The substrate of claim 1, wherein the first metal comprises aluminum, copper, or gold.

6. The substrate of claim 1, wherein the first metal is present in an amount of from 0 to 10 percent by weight of the functional layer.

7. The substrate of claim 6, wherein the first metal is present in an amount of from 0.5 to 2 percent by weight of the functional layer.

8. The substrate of claim 1, wherein the second metal comprises zinc, titanium, tin, manganese, magnesium, or silver.

9. The substrate of claim 1, wherein the second metal is present in an amount of from 0 to 10 percent by weight of AlN.

10. The substrate of claim 9, wherein the second metal is present in an amount of from 0.5 to 2 percent by weight of AlN.

11. The substrate of claim 1, wherein the functional layer comprises a first metal other than silver, the first coating of dielectric material comprises AlN, the first coating of dielectric material does not include a second metal, and the first coating of dielectric material is contiguous with the first face of the functional layer.

12. The substrate of claim 11, wherein the second coating of dielectric material is a metal oxide layer that is contiguous with the second face of the functional layer.

13. The substrate of claim 12, wherein the metal oxide comprises $ZnO$, $TiO_2$, $SnO_2$, $Nb_2O_5$, or $Ta_2O_5$.

14. The substrate of claim 1, wherein the functional layer does not include a first metal other than silver, either the first or second coating of dielectric material comprises a second metal, and the first or second coating of dielectric material that comprises a second metal is contiguous with the functional layer.

15. The substrate of claim 14, wherein the second coating of dielectric material is a metal oxide layer that is contiguous with the second face of the functional layer.

16. The substrate of claim 15, wherein the metal oxide comprises $ZnO$, $TiO_2$, $SnO_2$, $Nb_2O_5$, or $Ta_2O_5$.

17. The substrate of claim 1, wherein the functional layer comprises a first metal other than silver, either the first or second coating of dielectric material comprises a second metal, and the first or second coating of dielectric material that comprises a second metal is contiguous with the functional layer.

18. The substrate of claim 17, wherein the second coating of dielectric material is a metal oxide layer that is contiguous with the second face of the functional layer.

19. The substrate of claim 18, wherein the metal oxide comprises $ZnO$, $TiO_2$, $SnO_2$, $Nb_2O_5$, or $Ta_2O_5$.

20. The substrate of claim 1, wherein the stack of layers has the structure: base/dielectric material layer (1)/ functional layer (1) comprising silver/dielectric material layer (2)/functional layer (2) comprising silver/dielectric material layer (3);

wherein:

dielectric material layer (1) and dielectric material layer (2) comprise a metal oxide;

the dielectric material layer (3) comprises AlN; and the functional layer (2) comprising silver comprises the first metal and/or the dielectric material layer (3) comprises the second metal.

21. The substrate of claim 1, wherein the stack of layers has the structure: base/dielectric material layer (1)/ functional layer (1) comprising silver/dielectric material layer (2)/functional layer (2) comprising silver/dielectric material layer (3);

wherein:

at least one of the functional layer (1) comprising silver or the functional layer (2) comprising silver comprise the first metal;

each of the dielectric material layer (1), dielectric material layer (2), and dielectric material layer (3) comprise AlN; and at least one of dielectric material layer (1), dielectric material layer (2), or dielectric material layer (3) comprise the second metal.

22. The substrate of claim 1, wherein the stack of layers has the structure: base/dielectric material layer (1)/ functional layer (1) comprising silver/dielectric material layer (2)/functional layer (2) comprising silver/dielectric material layer (3);

wherein:

dielectric material layer (1) and dielectric material layer (3) comprises AlN;

dielectric material layer (2) comprises a metal oxide; and at least one of the functional layer (1) comprising silver or the functional layer (2) comprising silver comprise the first metal; and/or at least one of dielectric material layer (1) or dielectric material layer (3) comprise the second metal.

23. A transparent substrate comprising a base and a stack of thin layers, wherein said stack of thin layers comprises:

(i) a first coating of dielectric material;

(ii) a second coating of dielectric material; and (iii) a functional layer wherein the functional layer comprises silver, has a first face and a second face, is disposed between the first coating of dielectric material and the second coating of dielectric material, and at least one of the first coating of dielectric material or the second coating of dielectric material contacts the functional layer at an interface;

wherein at least one of the first coating of dielectric material or the second coating of dielectric material that contacts the functional layer comprises AlN and a second metal in an amount less than the aluminum, and the concentration of the second metal in the dielectric material comprising AlN is greatest near the interface.

24. The substrate of claim 23, wherein the coating of dielectric material comprising AlN is divided into layers, wherein each layer has a different concentration of the second metal.

* * * * *